Patented Nov. 12, 1940

2,221,626

UNITED STATES PATENT OFFICE 2,221,626

TREATMENT OF MANGANESE

Clarence Travis Anderson, Pittsburgh, Pa., assignor to Chicago Development Company, Chicago, Ill., a corporation of Illinois No Drawing. Application February 20, 1939,
Serial No. 257,457

6 Claims. (Cl. 75—80)

My invention relates to the purification of electrolytic manganese and is particularly concerned with the removal of sulphur therefrom.

Electrolytic manganese, as made in accordance with the process disclosed in the patent to Shelton, No. 2,119,560 and as prepared in accordance with other processes with which I am familiar, contains from about 0.2% to about 0.3% of sulphur, the remaining impurities being substantially negligible. It has been found that it is highly important, in connection with the preparation of certain alloys, that the sulphur content of electrolytic manganese be considerably reduced, preferably to about 0.02% and in certain instances to about 0.01% or less.

Pure manganese has been prepared heretofore by the distillation of silico-thermic, alumino-thermic and electrolytic manganese. Such process is, however, cumbersome, costly and does not lend itself to commercial use.

In accordance with my present invention, sulphur may be effectively removed from electrolytic manganese in a simple, inexpensive and expeditious manner. In general, my novel process comprises melting the electrolytic manganese and agitating it, in its molten condition, with an acidic oxide or salts formed therefrom or slags containing the same. Examples thereof are silica, titania, phosphorus pentoxide, alkali metal pyrophosphates, and the like. The sulphur is removed in the form of a gas, namely, sulphur dioxide.

The reaction is not a surface reaction but the acidic oxide or compound thereof appears to disperse or dissolve in the molten manganese and is apparently in equilibrium with the dispersed or dissolved manganese sulphide present in the manganese. As a result, a substantial though minor, amount of acidic oxide or the like must be added in some cases to obtain effective desulphurization. It should be understood that I do not wish to be limited by what the exact mechanism of the reaction may be since the invention is predicated upon discoveries and results entirely independently of theoretical considerations.

The following examples are illustrative of the practice of my invention. It will be understood that the proportions of materials and the times and temperatures of the reaction may be varied within limits without departing from the spirit of my invention:

Example A 50 pounds of electrolytic manganese, containing 0.22% sulphur, is melted in a high-frequency induction furnace to a temperature between 1700 degrees C. and 1750 degrees C. Due to the low conductivity of the manganese, it is necessary to have the crucible very hot before introducing the manganese. A graphite or other conducting material may be inserted in the crucible to accomplish this result. If difficulty arises in getting the manganese to melt properly, melting may be initiated by means of an oxyhydrogen torch.

To the molten manganese, maintained at the indicated temperature, 5 pounds of silica are added. The stirring which is produced by the high-frequency current is allowed to proceed for twenty minutes. The silica is then removed as completely as possible from the melt. The purified metal, on analysis, shows a content of 0.025% sulphur.

Example B

The procedure described in Example A was repeated employing, however, a temperature of 1300 degrees C. to 1350 degrees C. and utilizing sodium pyrophosphate in place of silica. The manganese metal, after completion of the process, contained 0.009% sulphur.

The melting of the manganese is preferably carried out in a highly dense alumina crucible although magnesia crucibles may be used in certain cases.

The proportions of acidic oxides are subject to relatively wide variation. In general, from 5% to 10% by weight of the manganese will be satisfactory in most cases although somewhat more or somewhat less may be utilized with good results.

The temperature at which the manganese and acidic oxides or the like are mixed is variable. It should not be so high as to cause undesired volatilization. About 1300 degrees C. to 1500 degrees C. represents a preferred working range, the lower temperature being definitely preferable as desulphurization appears to proceed more rapidly and effectively. The exact temperature employed may, in part, be determined by the properties of the acidic oxide or the like which is utilized.

What I claim as new and desire to protect by Letters Patent of the United States is:

1. The method of substantially reducing the sulphur content of electrolytic manganese which comprises contacting said electrolytic manganese, in molten condition, with a compound of the class consisting of acidic oxides and salts thereof for a period of time sufficient to effect the desired removal of the sulphur.

2. The method of substantially reducing the sulphur content of electrolytic manganese which comprises contacting said electrolytic manganese, in molten condition, with an alkali metal phosphate for a period of time sufficient to effect the desired removal of the sulphur.

3. The method of substantially reducing the sulphur content of electrolytic manganese which comprises agitating said electrolytic manganese, in molten condition, with silica for a period of time sufficient to effect the desired removal of the sulphur.

4. The method of substantially reducing the sulphur content of electrolytic manganese which comprises agitating said electrolytic manganese, in molten condition, with an alkali metal silicate for a period of time sufficient to effect the desired removal of the sulphur.

5. The method of reducing the sulphur content of electrolytic manganese from approximately 0.2% or more to approximately 0.2% or less which comprises melting said electrolytic manganese and mixing the same, while in molten condition, with a compound of the class consisting of acidic oxides and salts thereof.

6. The method of substantially reducing the sulphur content of electrolytic manganese which comprises maintaining a mass of said electrolytic manganese in a molten condition at a temperature of from about 1300 degrees C. to about 1500 degrees C., and mixing the same, while at such temperature, with a minor percentage of a compound of the class consisting of acidic oxides and salts thereof.

C. TRAVIS ANDERSON.